United States Patent
Mamidwar et al.

(10) Patent No.: US 9,674,569 B2
(45) Date of Patent: Jun. 6, 2017

(54) CLOCK RECOVERY IN TRANSPONDER-BONDED SYSTEMS USING BCRS AND MARKER PACKETS AT A SET-TOP BOX

(71) Applicant: BROADCOM CORPORATION, Irvine, CA (US)

(72) Inventors: Rajesh Shankarrao Mamidwar, San Diego, CA (US); Anand Tongle, San Diego, CA (US)

(73) Assignee: Avago Technologies General IP (Singapore) Pte. Ltd., Singapore (SG)

(*) Notice: Subject to any disclaimer, the term of this patent is extended or adjusted under 35 U.S.C. 154(b) by 657 days.

(21) Appl. No.: 14/147,328

(22) Filed: Jan. 3, 2014

(65) Prior Publication Data

US 2014/0359689 A1  Dec. 4, 2014

Related U.S. Application Data

(60) Provisional application No. 61/909,337, filed on Nov. 26, 2013, provisional application No. 61/828,639, filed on May 29, 2013.

(51) Int. Cl.
  *H04N 21/43* (2011.01)
  *H04N 21/2365* (2011.01)
  *H04N 21/2385* (2011.01)
  *H04N 21/242* (2011.01)
  *H04L 29/06* (2006.01)

(52) U.S. Cl.
  CPC ....... *H04N 21/4305* (2013.01); *H04L 65/604* (2013.01); *H04L 65/607* (2013.01); *H04L 69/28* (2013.01); *H04N 21/2385* (2013.01); *H04N 21/23655* (2013.01); *H04N 21/242* (2013.01); *H04N 21/4307* (2013.01)

(58) Field of Classification Search
  CPC ..... H04L 65/604; H04L 65/607; H04L 69/28; H04N 21/23655; H04N 21/2385; H04N 21/242; H04N 21/4305
  See application file for complete search history.

(56) References Cited

U.S. PATENT DOCUMENTS

| 7,372,873 B1 * | 5/2008 | Kumar | H04J 3/0632 348/E5.005 |
|---|---|---|---|
| 9,432,719 B2 * | 8/2016 | Neuman | H04N 5/4401 |
| 2005/0036512 A1 * | 2/2005 | Loukianov | H04J 3/0632 370/469 |

(Continued)

*Primary Examiner* — Jeffrey M Rutkowski
*Assistant Examiner* — Shah Rahman
(74) *Attorney, Agent, or Firm* — McDermott Will & Emery LLP (57) ABSTRACT

A transponder-bonded receiver system with clock recovery may include memory an and one or more processors coupled to the memory and configured to execute one or more program modules to perform: receiving multiple data streams each including a number of data packets, and a number of marker packets with embedded bonding clock references (BCRs) and including marker packet information; adjusting arrival-time-stamps (ATSs) of the marker packets by using the BCRs and including capturing timing between the marker packets based on a local free running counter of the receiver; and determining an adjusted ATS corresponding to an ATS at the receiver for each of the plurality of packets using the ATS and a delta-ATS.

24 Claims, 9 Drawing Sheets

(56) References Cited

U.S. PATENT DOCUMENTS

| | | | |
|---|---|---|---|
| 2005/0039065 A1* | 2/2005 | Cheung | H04N 21/4302 713/400 |
| 2005/0175040 A1* | 8/2005 | Holborow | H04N 7/10 370/509 |
| 2006/0136768 A1* | 6/2006 | Liu | H04N 5/4401 713/400 |
| 2006/0146815 A1* | 7/2006 | Tse | H04L 7/0331 370/389 |
| 2007/0286241 A1* | 12/2007 | Fisher | H04N 7/54 370/486 |
| 2008/0019398 A1* | 1/2008 | Genossar | H04J 3/0632 370/498 |
| 2008/0253466 A1* | 10/2008 | Fu | H04N 21/2389 375/240.26 |
| 2010/0189424 A1* | 7/2010 | Doehla | H04N 21/85406 386/241 |
| 2014/0173136 A1* | 6/2014 | Hazelet | G06F 1/12 709/248 |

* cited by examiner

CLOCK RECOVERY IN TRANSPONDER-BONDED SYSTEMS USING BCRS AND MARKER PACKETS AT A SET-TOP BOX

CROSS-REFERENCE TO RELATED APPLICATIONS

This application claims the benefit of priority under 35 U.S.C. §119 from United States Provisional Patent Applications 61/828,639 filed May 29, 2013 and 61/909,337 filed Nov. 26, 2013, which are incorporated herein by reference in their entireties.

TECHNICAL FIELD

The present description relates generally to data communication, and more particularly, but not exclusively, to clock recovery in transponder-bonded systems using bonding clock references (BCRs) and marker packets at a set-top box (STB).

BACKGROUND

Rapid advances in electronics and communication technologies, driven by immense private and public sector demand, have resulted in the widespread adoption of smart phones, personal computers, internet ready televisions and media players, and many other devices in every part of society, whether in homes, in business, or in government. These devices have the potential to consume significant amounts of audio and video content. At the same time, data networks have been developed that attempt to deliver the content to the devices in many different ways. Further improvements in the delivery of content to the devices can help continue to drive demand for not only the devices, but for the content delivery services that feed the devices.

In broadcast systems that broadcast multiple programs from a number of content sources, program clock references (PCRs) may be inserted in the program data at regular intervals. These PCRs may include snapshot of the system time clock (STC) counter running at a free running encoder clock (e.g., at 27 MHz). In order to avoid buffer overflows/underflows, it is important for an integrated receiver device (IRD) (e.g., a set-top box) to recover the encoder clock and to use that clock for display at the IRD.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations. In one or more instances, well-known structures and components are shown in block timing diagram form in order to avoid obscuring the concepts of the subject technology.

The subject technology may provide a method and implementation for clock recovery in transponder-bonded video systems. In one or more aspects, the clock recovery at an integrated receiver device (IRD) of the transponder-bonded video systems may be implemented by using bonding clock references (BCRs). The BCRs may be inserted by the head-end of a broadcast system in marker packets. In some aspects, the clock recovery may be implemented by using the arrival time of the program clock references (PCRs) at the IRD.

Figure 1:
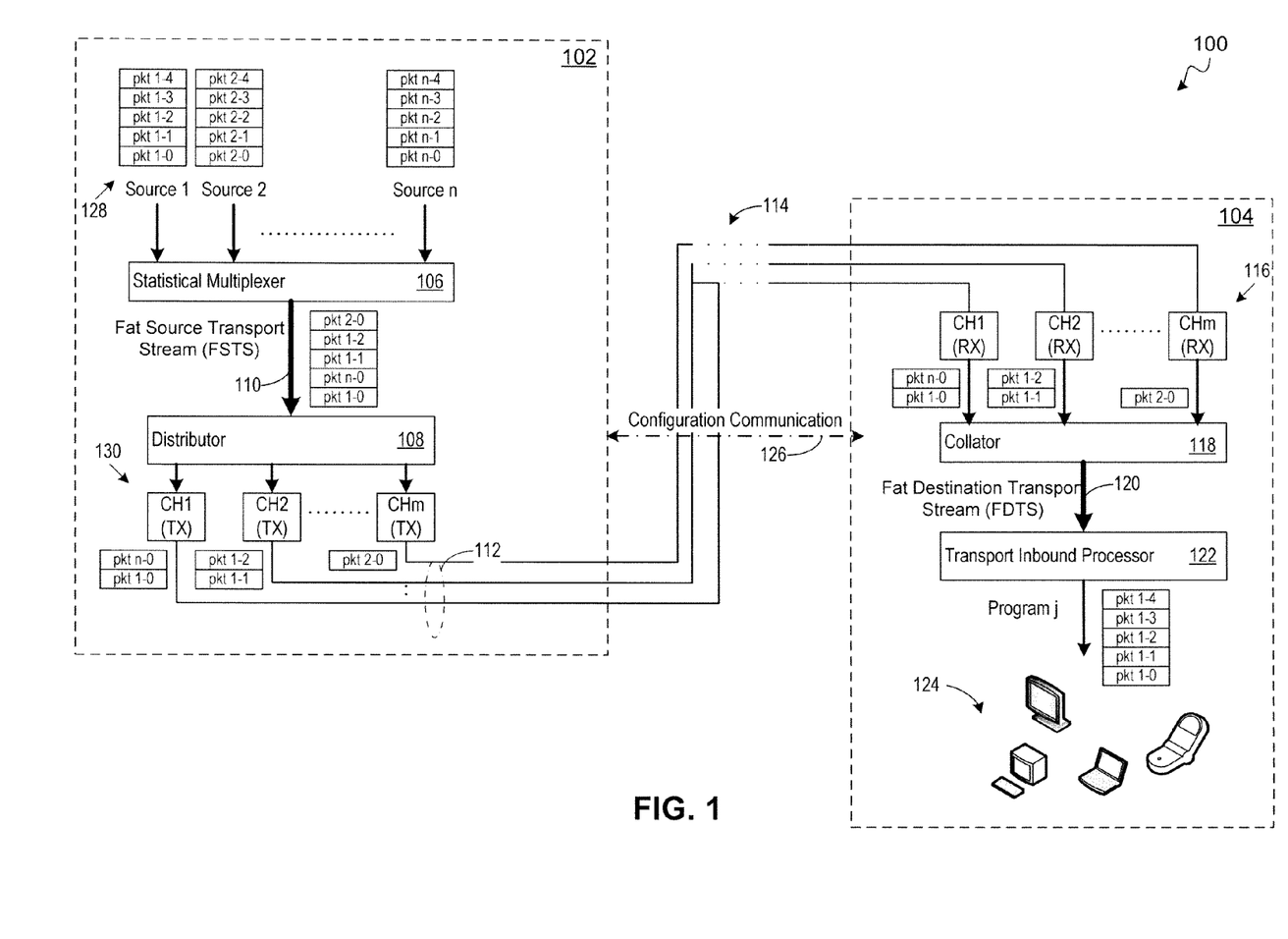
FIG. 1 illustrates an example of an architecture of a transponder-bonded system with clock recovery using marker packets in accordance with one or more implementations.

FIG. 1 illustrates an example of an architecture 100 of a transponder-bonded system with clock recovery using marker packets in accordance with one or more implementations of the subject technology. The architecture 100 delivers data (e.g., audio streams and video programs) from a source 102 to a destination device 104 (e.g., integrated receiver device (IRD)). The source 102 may include satellite, cable, or other media providers, and may represent, for example, a head-end distribution center that delivers content to consumers. The source 102 may, for example, receive the data in the form of Motion Picture Expert Group 2 (MPEG2) Transport Stream (TS) packets 128, and the data may include audio/visual programming. The destination device 104 may be located at a home, business, or other location, and may include, for example, a set-top box (STB) that processes the data sent by and received from the source 102. The subject disclosure makes reference to packets, and in some places specific mention is made of MPEG2 TS packets, but is not limited to MPEG2 TS packets.

The source 102 may include a statistical multiplexer 106 and a distributor 108. The statistical multiplexer 106 facilitates making data transmission efficient by reducing idle time in the fat source transport stream (FSTS) 110. In that regard, the statistical multiplexer 106 may interleave data from multiple input sources together to form the transport stream 110. For example, the statistical multiplexer 106 may allocate additional FSTS 110 bandwidth among high bit rate program channels and relatively less bandwidth among low bit rate program channels to provide the bandwidth needed to convey widely varying types of content at varying bit rates to the destination 104 at any desired quality level. Thus, the statistical multiplexer 106 may flexibly divide the bandwidth of the FSTS 110 among any number of input sources.

A number of input sources such as Source 1, Source 2 . . . Source n may be present. There may be any number of such input sources carrying any type of audio, video, or other type of data (e.g., web pages or file transfer data). Specific examples of source data include MPEG or MPEG2 TS packets for digital television (e.g., individual television programs or stations), and 4K×2K High Efficiency Video Coding (HVEC) video (e.g., H.265/MPEG-H) data, but the input sources may provide any type of input data.

The FSTS 110 may have a data rate that exceeds the transport capability of any one or more communication links between the source 102 and the destination 104. For example, the FSTS 110 data rate may exceed the data rate supported by a particular cable communication channel exiting the source 102. To help deliver the aggregate bandwidth of the FSTS 110 to the destination 104, the source 102 includes a distributor 108 and modulators 130 that feed a bonded channel group 112 of multiple individual communication channels. In other words, the source 102 distributes the aggregate bandwidth of the FSTS 110 across multiple outgoing communication channels that form a bonded channel group 112, and that together provide the bandwidth for communicating the data in the FSTS 110 to the destination 104.

The distributor 108 may determine which data in the FSTS 110 to send on which communication channel, and may divide the FSTS 110 into chunks of one or more packets. The chunks may vary in size over time, based on the communication channel that will carry the chunk, the program content in the chunk, or based on any other desired chunk decision factors implemented in the distributor 108. The distributor 108 may forward any particular chunk to the modulator for the channel that the distributor 108 has decided will convey that particular chunk to the destination 104. The chunks may include one or more packets from any of the program sources. For example, a chunk may be 1 packet, 10 packets, 100 packets, 27 packets, 10,000 packets, 100 milli-seconds (ms) of packets, 20 ms of packets, 30 ms of video data, 5 seconds of audio data, or any other number or timing of packets or audio/visual content.

In that regard, the multiple individual communication channels within the bonded channel group 112 provide an aggregate amount of bandwidth, which may be less than, equal to, or in excess of the aggregate bandwidth of the STS 110. As just one example, there may be three 30 Mbs physical cable channels running from the source 102 to the destination 104 that handle, in the aggregate, up to 90 Mbs. The communication channels in the bonded channel group 112 may be any type of communication channel, including dial-up (e.g., 56 Kbps) channels, ADSL or ADSL 2 channels, coaxial cable channels, wireless channels such as 802.11a/b/g/n channels or 60 GHz WiGig channels, Cable TV channels, WiMAX/IEEE 802.16 channels, Fiber optic, 10 Base T, 100 Base T, 1000 Base T, power lines, or other types of communication channels.

The bonded channel group 112 travels to the destination device 104 over any number of transport mechanisms 114 suitable for the communication channels within the bonded channel group 112, for example, physical cabling (e.g., fiber optic or cable TV cabling), wireless connections (e.g., satellite, microwave connections, 802.11a/b/g/n connections), or any combination of such connections.

At the destination device 104, the bonded channel group 112 is input into individual channel demodulators 116. The channel demodulators 116 recover the data sent by the source 102 in each communication channel. A collator 118 collects the data recovered by the demodulators 116, and may create a fat destination transport stream (FDTS) 120. The FDTS 120 may be one or more streams of packets recovered from the individual communication channels as sequenced by the collator 118.

The destination device 104 also includes a transport inbound processor (TIP) 122 that can process the FDTS 120. For example, the TIP 122 may execute program identifier (PID) filtering for each channel independently of other channels. To that end, the TIP 122 may identify, select, and output packets from a selected program (e.g., a selected program 'j') that are present in the FDTS 120 and drop or discard packets for other programs. In the example shown in FIG. 1, the TIP 122 has recovered program 'j', which corresponds to the program originally provided by Source 1. The TIP 122 provides the recovered program to any desired endpoints 124, such as televisions, laptops, mobile phones, and personal computers. The destination 104 may be a set top box, for example, and some or all of the demodulators 116, collator 118 and TIP 122 may be implemented as hardware, software, or both in the set top box.

The source 102 and the destination device 104 may exchange configuration communications 126. The configuration communications 126 may travel over an out-of-band or in-band channel between the source 102 and the destination 104, for example in the same or a similar way as program channel guide information, and using any of the communication channel types identified above. One example of a configuration communication is a message from the source 102 to the destination 104 that conveys the parameters of the bonded channel group 112 to the destination 104. More specifically, the configuration communication 126 may specify the number of communication channels bonded together; identifiers of the bonded communication channels; the types of programs that the bonded communication channels will carry; marker packet format; chunk, program packet, or marker packet size; chunk, program packet, or marker packet PID or sequence number information, or any other chunk or bonding configuration information that facilitates processing of the bonded channel group 112 at the destination 104. One example of a configuration communication message from the destination 104 to the source 102 is a configuration communication that specifies the number of communication channels that the destination 104 may process as eligible bonded channels; identifiers of the eligible bonded channels; status information concerning status of the demodulators 116, e.g., that a demodulator is not functioning and that its corresponding communication channel should not be included in a bonded channel group; channel conditions that affect bit rate or bandwidth; or any other information that the source 102 and the distributor 108 may consider that affects processing of the data from the sources into a bonded channel group.

Figure 2:
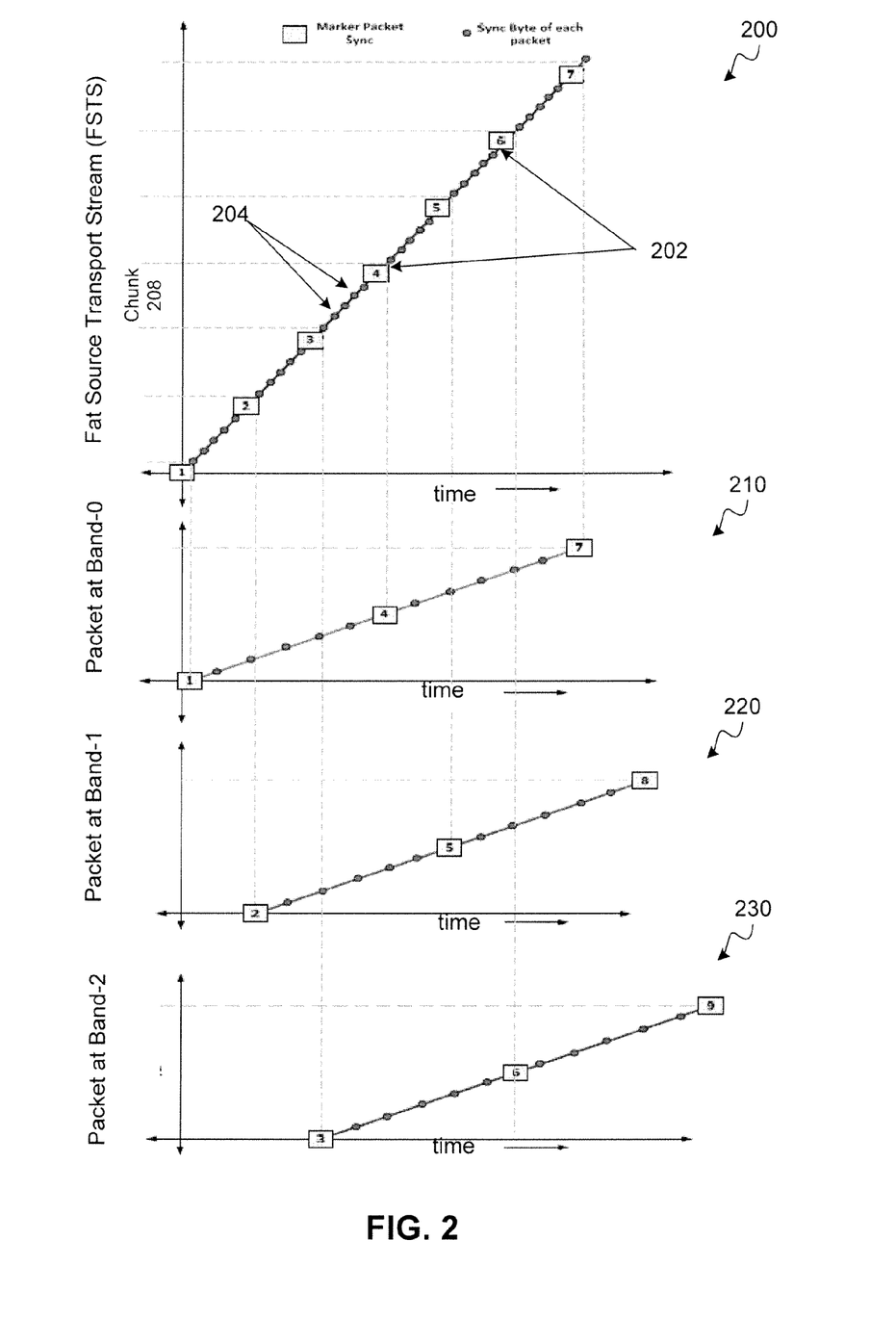
FIG. 2 illustrates example timing diagrams of channel bonding of a fat source transport stream (FSTS) with marker packets in a transponder-bonded system in accordance with one or more implementations.

FIG. 2 illustrates example timing diagrams 200, 210, 220, and 230 of channel bonding of an FSTS with marker packets in a transponder-bonded system in accordance with one or more implementations of the subject technology. The timing diagram 200 shows the FSTS, generated by a statistical multiplexer (e.g., 106 of FIG. 1), as a function of time. The marker packets (MPs) 202 shown as square markers are numbered from 1 to 7 at chunk boundaries. Between the marker packets 202 are the synch bytes 204, shown with small circles, which are associated with the packets that form a corresponding chunk 208. The temporal location of the packets 202 in the FSTS of timing diagram 200 and their relative location are shown by dotted lines. The other timing diagrams 210, 220, and 230 depict the distributed stream (e.g., at the head-end) including packet band-0, band-1, and band-2 corresponding to the respective transponder channels 1, 2 and 3 of FIG. 1. As shown in diagrams 210, 220, and 230, the temporal location of the marker packets at the transponder output (e.g., transponder channels 1, 2 and 3) are the same as in the FSTS shown in the diagram 200.

However, the data rate of the FSTS is higher than the individual data rates of the transponder channels 1, 2, and 3. In other words, the packet-to-packet distance (in time) may change when the chunks in the FSTS are released by the transponders. Nonetheless, since the marker packet temporal location is the same as in the FSTS, the arrival time of the marker packets at the IRD can be used for recovering timing information at head-end in terms of IRD clock. Due to latencies in the transmission links (e.g., of the communication network), the packets may arrive at the IRD in out-of-order sequences. The locations of the marker packets may be skewed and hence it may not be possible to extract the exact timing information when the packets are received at the IRD.

Figure 3:
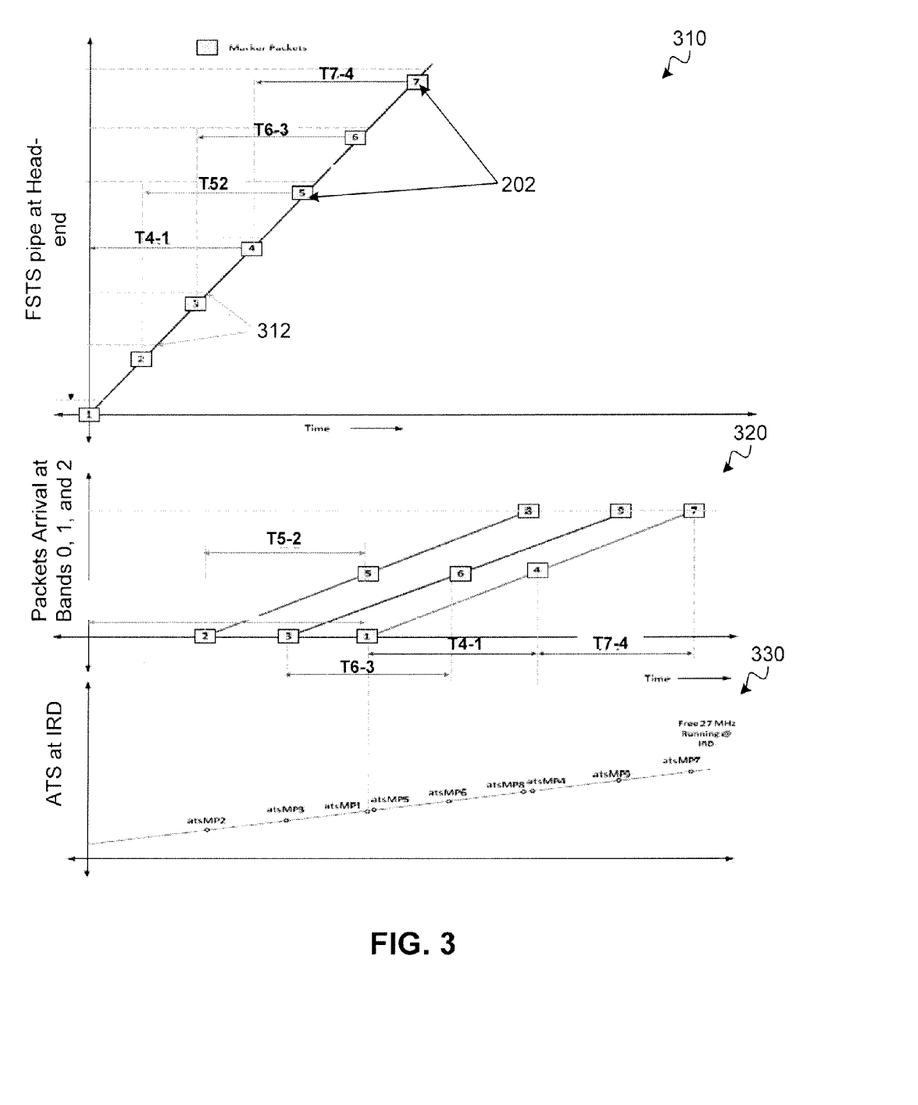
FIG. 3 illustrates example timing diagrams of an FSTS with marker packets and packet arrival times in various channels of a transponder-bonded system in accordance with one or more implementations.

FIG. 3 illustrates example timing diagrams 310, 320, and 330 of an FSTS with marker packets (MPs) and packet arrival times in various channels of a transponder-bonded system in accordance with one or more implementations of the subject technology. The timing diagram 310 depicts the FSTS generation with the insertion of the marker packets 202 (e.g., shown with squares 1-7 for MP1-MP7) at chunk boundaries. The broken lines 312 mark the end of the marker packets at the distributor 108 of FIG. 1. The marker packet-to-packet timing differences as shown, for example, by T4-1 (e.g., for MP1-to-MP4), T5-2, T6-3, and T7-4 are the same. The timing diagram 320 illustrates effect of latency on the arrival time stamp (ATS) recorded at the IRD due to communication network latency variations. For starting the construction of the program stream at the IRD, the IRD may have to wait for marker packets MP2, MP3, and MP1. The local ATS values corresponding to these packets, as shown in the timing diagram 330, are skewed and hence it is not possible to compute the ATS of every packet in the chunk between the two consecutive marker packets (i.e. between MP1 and MP2). In one or more implementations, the ATS values can be generated in a demodulator chip or a back-end chip.

In one or more implementations, a scheme to recover the packet timings at the FSTS may use BCRs and chunk sizes. From timing diagrams of FIGS. 2 and 3, it can be concluded that only the relative distance (in time) between the marker packets on a specific transponder (e.g., T7-4, T6-3, T5-2, or T4-1) is preserved at the IRD. Accordingly, the packet timings can only be recovered by using marker packets of a single band corresponding to a single transponder as a reference. Such a band may be referred to as a primary band in the transponder-bonded group 112 of FIG. 1. For example, the primary band can be the band for which the first marker packet is used while reconstructing the program stream at the IRD or a pre-defined band in the transponder-bonded group 112, which provides the first marker packet in the reconstructed stream.

Consider that the band-0 corresponding to the transponder channel 1 is defined as the primary band in the example discussed herein. In this case, the reconstructed stream at the IRD can have the following sequence of marker packets: MP1, MP2, MP3, MP4, MP5 . . . and so on. The ATS of the packets between MP1 to MP2 may be computed based on the Pkt-to-Pkt ATS-delta, defined as:

$$\text{Pkt-to-Pkt ATS-delta} = (\text{ATS-MP4} - \text{ATS-MP1})/(\text{NP1-4}) \quad (1)$$

Where NP1-4 is the number of packets between the MP1 to MP4 including the packets following MP2 and MP3, an ATS-MP4 and ATS-MP1 represent the ATS of MP4 and MP1, respectively.

Computation of such Pkt-to-Pkt ATS-delta may complicate the system and add latency in starting the channel (e.g., as two consecutive marker packets may always be required before starting the reconstruction of the FSTS at IRD). To simplify the Pkt-to-Pkt ATS-delta calculations, BCRs and chunk size may be added in the marker packet information, as disclosed herein. The BCRs may include the snapshot of free running timestamp counter at the distributor 108 of FIG. 1 taken at the marker packet sync. The format of the BCR can be the same as the MPEG2-Program Clock Reference (PCR). The chunk size may include the number of packets between the two marker packets in the FSTS domain.

Figure 4:
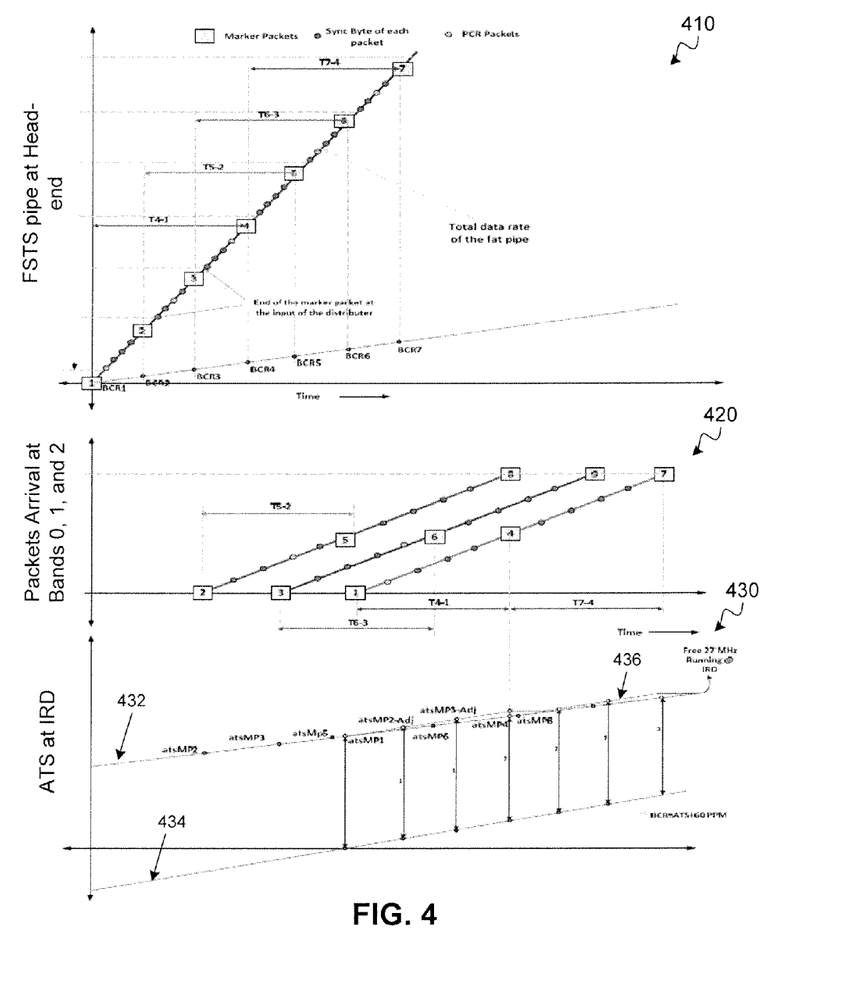
FIG. 4 illustrates example timing diagrams of arrival time stamp (ATS) generation using bonding clock references (BCRs) in a transponder-bonded system in accordance with one or more implementations.

FIG. 4 illustrates example timing diagrams 410, 420, and 430 of ATS generation using BCRs in a transponder-bonded system in accordance with one or more implementations of the subject technology. The timing diagram 410 shows FSTS pipe at the head-end. As shown in the diagram 410, at the transponder bonding system, the BCRs (e.g., BCR1-BCR7) are inserted by the head-end in the marker packets (e.g., MP1-MP7, shown as squares). Timing diagram 420 shows the packet arrival times corresponding to band-0 (e.g., including MP1, MP4, and MP7), band-1 (e.g., including MP2, MP5, and MP8), and band-2 (e.g., including MP3, MP6, and MP9) at the IRD. As BCRs are running at free running clock at the head-end, the BCR-to-BCR distance between two marker packets can be different from the ATS-to-ATS distance between same two marker packets, as they arrive at the IRD. Considering the band-0 as the primary band, the ATS values are computed as follows:

ATS-MP1=ATS-MP1 (e.g., the reference ATS, as band-0 is a primary band)

$$\text{Pkt-to-Pkt ATS-delta Chunk1} = (\text{BCR1} - \text{BCR0})/(\text{chunk size in MP0}) \quad (2)$$

Where the ATS values of the packets in chunk1 (e.g., between MP1 and MP2) may be computed as follows:

$$\text{ATS Packet 1} = \text{ATS-MP1} + \text{Pkt-to-Pkt ATS-delta Chunk 1} \quad (3)$$
$$\text{ATS Packet 2} = \text{ATS-MP1} + 2 * \text{Pkt-to-Pkt ATS-delta Chunk 1}$$
$$\ldots$$
$$\text{ATS Packet X} = \text{ATS-MP1} + X * \text{Pkt-to-Pkt ATS-delta Chunk 1}$$
$$\text{ATS-MP2} = \text{ATS-MP1} + \text{chunk size} * \text{Pkt-to-Pkt ATS-delta}, \quad (4)$$

as there can be different number of packets between MP1 to MP2, Pkt-to-Pkt ATS-delta may be recomputed here. However, the base ATS value is still referenced to the primary band number (e.g., band-0).

$$\text{Pkt-to-Pkt ATS-delta Chunk2} = (\text{BCR2} - \text{BCR1})/(\text{chunk size in MP1}).$$

The ATS values of the packets in chunk2 may be computed as follows:

$$ATS \text{ Packet } 1 = ATS\text{-}MP2 + Pkt\text{-}to\text{-}Pkt \ ATS\text{-delta Chunk } 2 \quad (5)$$
$$ATS \text{ Packet } 2 = ATS\text{-}MP2 + 2 * Pkt\text{-}to\text{-}Pkt \ ATS\text{-delta Chunk } 2$$
$$\ldots$$
$$ATS \text{ Packet } X = ATS\text{-}MP2 + X * Pkt\text{-}to\text{-}Pkt \ ATS\text{-delta Chunk } 2$$

Similarly the adjusted ATS value for MP3, MP4, etc. can be computed, and given new names. For example, the adjusted ATS value for MP4 may be referred to as ATS-MP4-adjusted.

The timing diagram 430 shows the ATSs of the MP packets at the IRD (e.g., line 432), the timings of corresponding BCRs at the head-end (line 434), and the adjusted ATSs in a reconstructed stream (e.g., line 436). In one or more implementations of the subject technology, to ensure that the timings between the packets are captured in terms of local free running counter, the value of ATS of a marker packet such as ATS-MP4 may be compared against the corresponding adjusted value such as ATS-MP4-adjusted. If the ATS-MP4-adjusted>ATS-MP4, then the adjusted value is considered, otherwise the adjusted value is ignored. As the ATS values of marker packets of band-0 on the primary transponder are used as reference, the adjusted values of the ATS for other packets in a chunk, such as in chunk4, may be evaluated using the corresponding ATS and the adjusted ATS such as the ATS-MP4 and the ATS-MP4-Adjusted. The line 436 shows the adjusted values required for generating the ATS of the reconstructed program stream.

The scheme of the subject technology, as discussed above, may include a number of advantages. For example, the subject technology may: reduce the computational complexity of finding out the total number of packets distributed in all bands between the two marker packets of the same band; the adjusted ATS values and PCR values from the original stream can be used for clock recovery (e.g., generate locked clock at STP/IRD to original encoder clock) at the STB; and BCRs can be used for nullifying jitter introduced by bonding.

In one or more implementations, to recover the encoder clock at the IRD, the arrival time of the PCR packets at the IRD may be used. ATS of the PCR packets can be recorded as snapshot of the counter running at a free running IRD clock (e.g., at 27 MHz). The difference between two PCR values in the stream and difference between the arrival times of these two PCR packets may provide the information to IRD, of the deviation of the local free running clock from the encoder clock. Such deviation can be used for adjusting the decoder's clock so that it follows the encoder clock.

Figure 5:
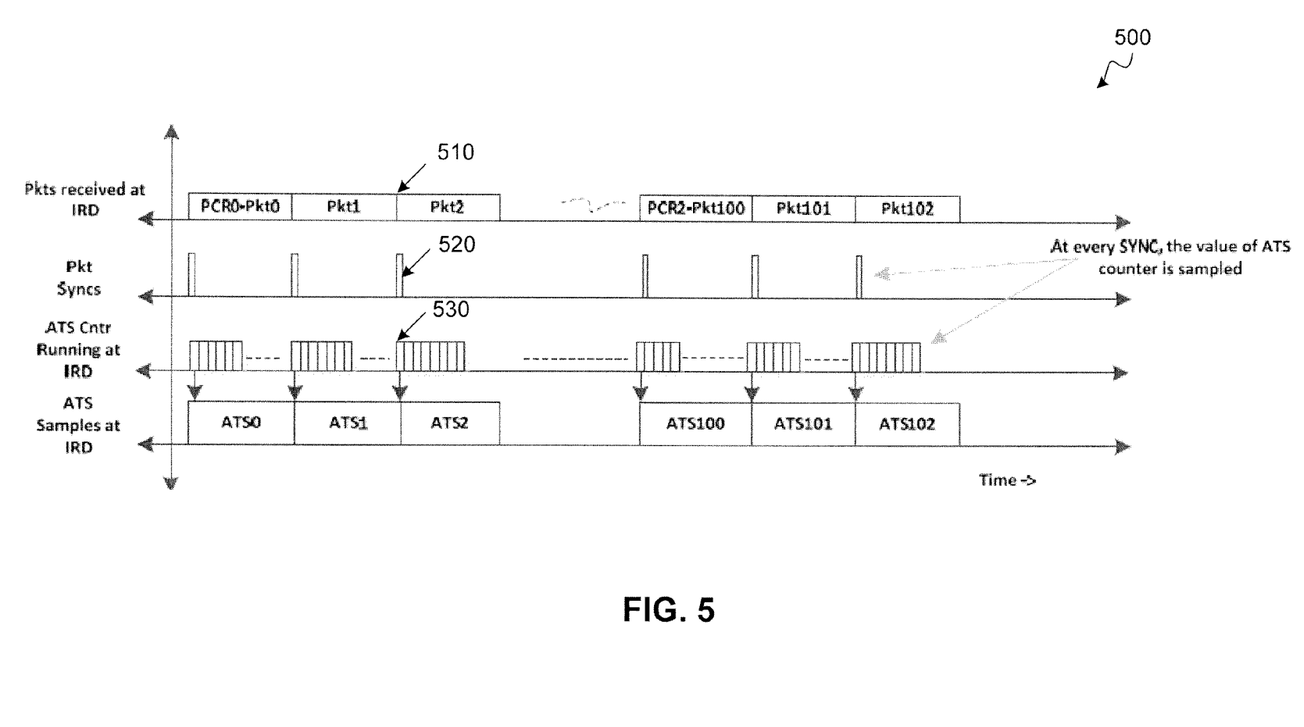
FIG. 5 illustrates an example of ATS sampling for clock recovery at a receiver of a transponder-bonded system in accordance with one or more implementations.

FIG. 5 illustrates an example timing diagram 500 of ATS sampling for clock recovery at a receiver of a transponder-bonded system 100 of FIG. 1 in accordance with one or more implementations of the subject technology. In the timing diagram 500, the deviation of (ATS100-ATS0) with respect to (PCR2-Pkt100-PCR0-Pkt0) is used for adjusting the local clock (e.g. at the IRD), on which ATS counter is running. In transponder bonded system of FIG. 1, as discussed above, the chunk boundaries are de-marked by using marker information about the chunk sequence numbers in the FSTS, which are carried by MPs. The marker information may be used at the IRD for re-assimilation of the chunks distributed over multiple transponders. The presence of marker information in the packet may be indicated by a "priority indicator" in the second byte of the MPEG header fields in the transport packets. Packet syncs (e.g., 520) are derived from timing of packets (e.g., 510) received at the IRD. At every sync (e.g., 520), a value of the ATS counter running at IRD clock (e.g., at 530) is sampled.

Figure 6A:
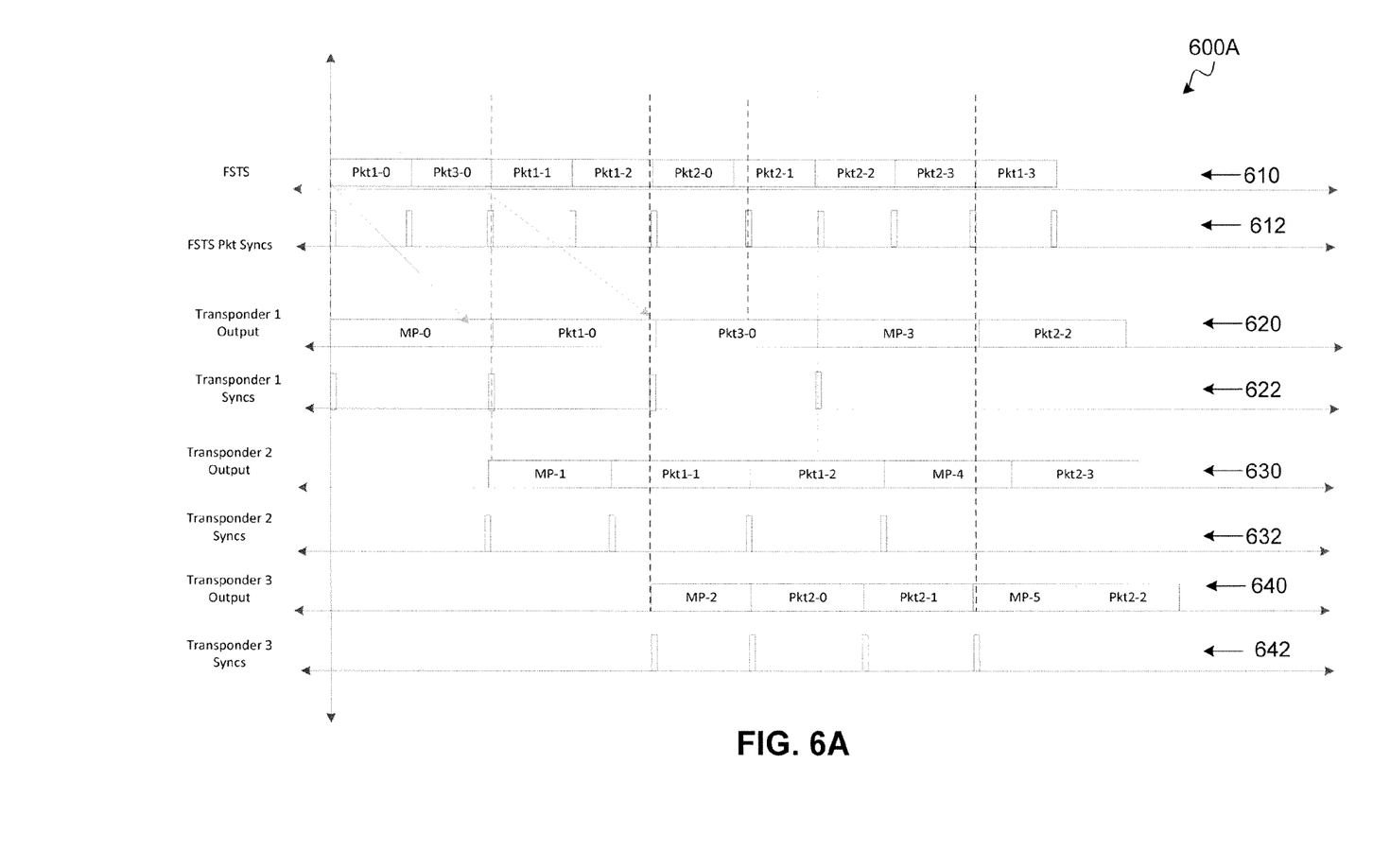
FIGS. 6A-6B illustrate timing diagrams showing examples of marker packet timings at a head-end and at a receiver of a transponder-bonded system in accordance with one or more implementations of the subject technology.
Figure 6B:
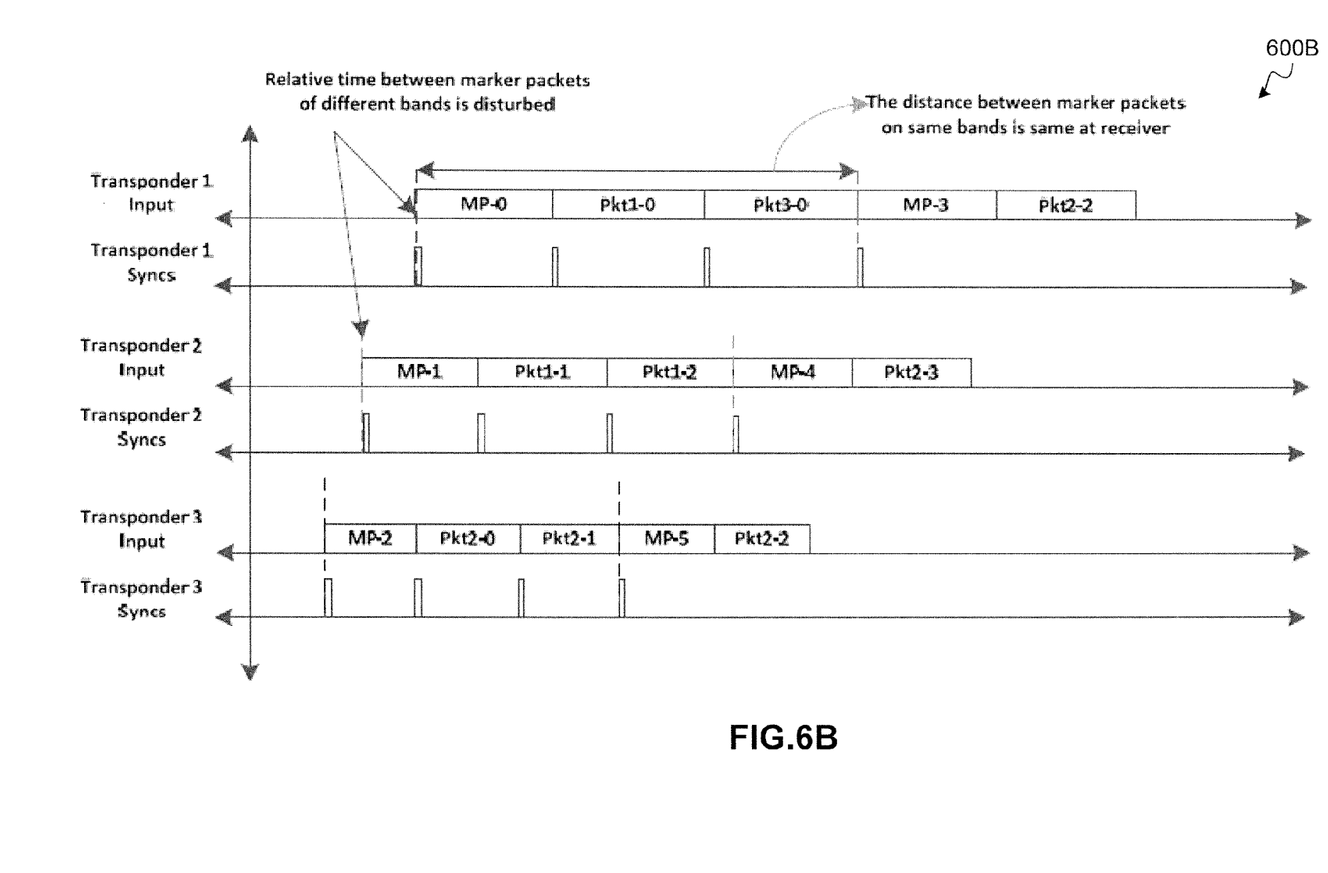

FIGS. 6A-6B illustrate timing diagrams 600A and 600B showing examples of marker packet timings at a head-end and at the IRD of a transponder-bonded system in accordance with one or more implementations of the subject technology. The timing diagram 600A includes the FSTS timing 610, the corresponding sync timing 612, transponder output timings 620, 630, and 640, and the corresponding sync timings 622, 632, and 642. As seen from these timing diagrams, the packet-to-packet distance (in time) changes when the chunks in the FSTS are released by transponders. However the marker packet temporal locations remains the same as the chunk start timing in FSTS. This property of the transponder-bonded system can be used for recovering the PCR packet timing information. For example, if the Pkt3-0 and Pk2-0 are PCR packets, then their arrival values at the IRD in IRD clock domain can be calculated as:

$$\text{Packet-to-packet time using IRD clock} = (ATS\text{-}MP1 - ATS\text{-}MP0)/2 \quad (6)$$

The division by 2 is because the Pkt3-0 and Pk2-0 in the FSTS 610 are two packets apart. In general, however, if the number of MP2 transport packets between MP1 and MP0 is N, then:

$$\text{Packet-to-packet time using IRD clock} = (ATS\text{-}MP1 - ATS\text{-}MP0)/N \quad (7)$$

As the chunks reach the IRD, they experience different delays due to unbalanced communication network latencies, as shown in the timing diagram 600B of FIG. 6B. Due to such communication latencies, the marker packet arrival times do not indicate the exact difference between the PCR packets in the IRD clock domain. Therefore it is not possible to use the ATS samples of the marker packets of multiple bands to recover the timings as shown in the timing diagram 600B. However, from the timing diagram 600B, it is clear that the distance between the two marker packets on the same band (e.g., band-0 corresponding to transponder channel 1) is not disturbed. This leads to an important characteristic of the bonded channels that the timing distance between the two marker packets (e.g., MP3 and MP0) in the IRD clock domain is the same as the distance between the packets Pkt1-0 to Pkt2-2 in the FSTS 610.

In one or more implementations, a method for clock recovery in the transponder-bonded system may adjust each ATS in the marker packets. For this purpose, an adjusted ATS corresponding to an ATS at the receiver for each packet may be determined using the ATS and a delta-ATS. The packet timings can be recovered at the IRD in the IRD clock domain by using the delta-ATS (e.g., Pkt2Pkt ATS-delta) determined, for example, from the distance between the ATS of the packets between Pkt1-0 to Pkt2-2 as follows:

$$Pkt2Pkt \ ATS \ delta = (ATS\text{-}Pkt2\text{-}2 - ATS\text{-}Pkt1\text{-}0)/6 \quad (8)$$

Where, the division by six is because the packets Pkt1-0 and Pkt2-2, in the FSTS 610, are apart by six packets. In some aspects, if the ATS of the packet Pkt1-0 of the timing diagram 600A is zero, then the ATS of the subsequent packets in the timing diagram 600A can be determined as follows:

$$ATS\text{-}Pkt1\text{-}0 = 0$$

$$ATS\text{-}Pkt3\text{-}0 = ATS\text{-}Pkt1\text{-}0 + Pkt2Pkt\ ATS\ \text{Delta}$$

$$ATS\text{-}Pkt1\text{-}1 = ATS\text{-}Pkt3\text{-}0 + Pkt2Pkt\ ATS\ \text{Delta}$$

$$ATS\text{-}Pkt1\text{-}2 = ATS\text{-}Pkt1\text{-}1 + Pkt2Pkt\ ATS\ \text{Delta}$$

$$\ldots$$

$$ATS\text{-}Pkt2\text{-}1 = ATS\text{-}Pkt2\text{-}0 + Pkt2Pkt\ ATS\ \text{Delta}$$

In short, the IRD has the ability to store and count the packets between marker packets of different bands and then add all the packets that were released between the two marker packets of the same band. This makes it possible to recover the packet timings in the FSTS at the IRD, as discussed above. In some implementations, the count of the packets between two marker packets can be derived from chunk size information. Alternatively, the count of packets between marker packets can be measured at the receiver.

Figure 7:
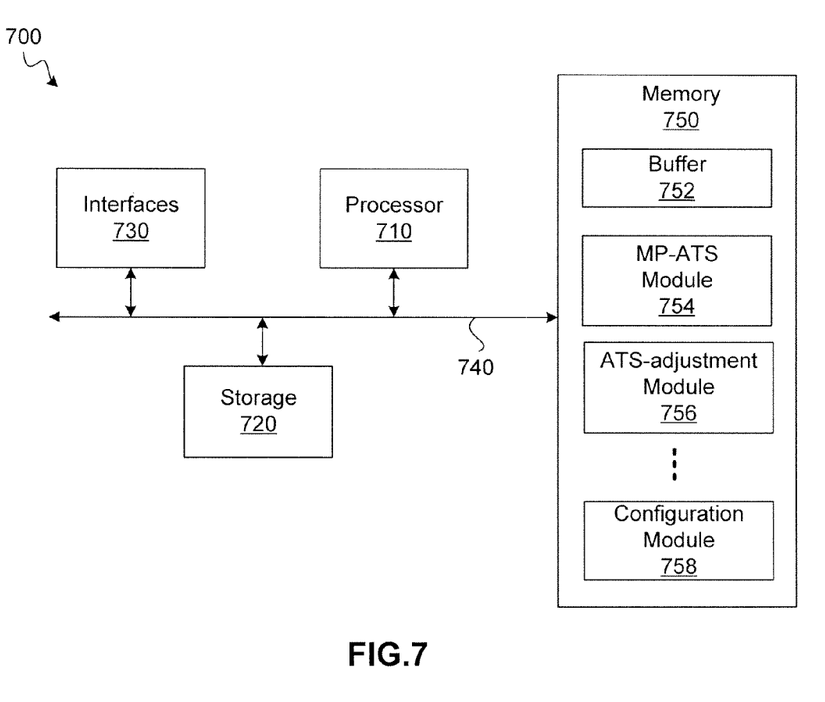
FIG. 7 illustrates an example of a transponder-bonded receiver system with clock recovery in accordance with one or more implementations.

FIG. 7 illustrates an example of a transponder-bonded receiver system 700 with clock recovery in accordance with one or more implementations of the subject technology. The system 700 may include a processor 710, a storage device 720, a network interface 730, and memory 750, coupled to one another via a bus 740. Examples of the processor 710 may include a general-purpose processor, one or more hardware cores, one or more controllers or logic, or any other type of processor. The network interface 730 may perform communications with other devices, such as a source 102 of the transponder-bonded system 100 of FIG. 1, a computer, or a portable device such as a mobile phone, a laptop, a tablet, or a remote control, or a display device. The communications may include receiving or sending data packets and/or control packets. The memory 750 may include RAM, DRAM, SRAM, T-RAM, Z-RAM, TTRAM, flash memory, CAM, TCAM, or any other type of memory. The storage device 720 may include a disk drive, flash memory, or any other storage media.

The memory 750 may include one or more buffers 752 and program modules such as an MP-ATS module 754, an ATS-adjustment module 756, and a configuration module 758. In some aspects, the MP-ATS module 754, when executed by a processor (e.g., 710), may be configured to receive a number of data streams (e.g., 620, 630, and 640 of FIG. 6A) each including multiple data packets, and several marker packets. The marker packets may be embedded with BCRs and may include marker packet information. ATS-adjustment module 756, when executed by a processor (e.g., 710), may adjust arrival-time-stamps (ATSs) of the plurality of marker packets by using the BCRs and capturing timing between the plurality of marker packets based on a local free running counter of the receiver (e.g., IRD), as described above with respect to FIG. 4. In one or more implementations, the ATS-adjustment module 756, when executed by a processor (e.g., 710), may determine an adjusted ATS corresponding to an ATS at the IRD for each of the plurality of packets using the ATS and a delta-ATS, as discussed above with respect to FIGS. 6A and 6B. The configuration module 758, when executed by a processor (e.g., 710), may receive the configuration communication 126 of FIG. 1 and use the information in the configuration communication 126 for controlling collating of the packets received from the various transponders and selecting the packets corresponding to a selected program for display on a display device. In some aspects, the configuration module 758 may be configured to perform, when executed by a processor, the functionalities of the collator 118 and the transport inbound processor 122 of FIG. 1.

Figure 8A:
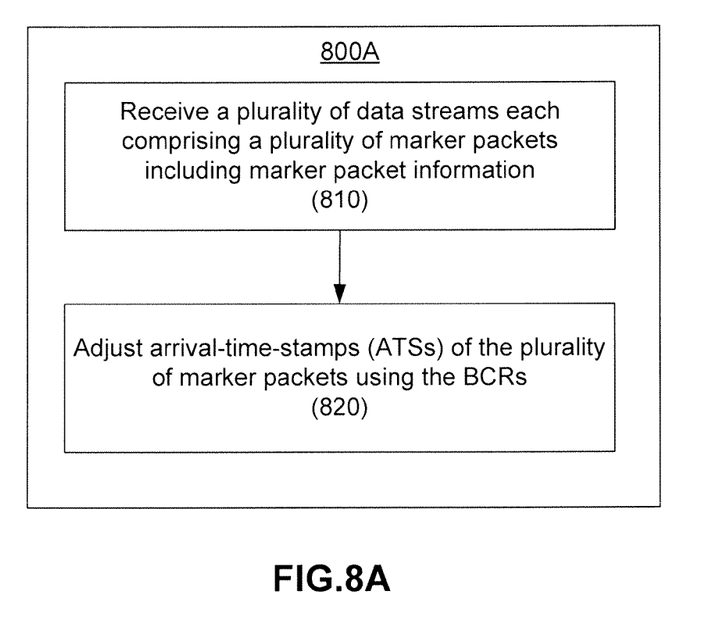
FIGS. 8A-8B illustrate examples of methods for clock recovery in a transponder-bonded receiver system in accordance with one or more implementations.
Figure 8B:
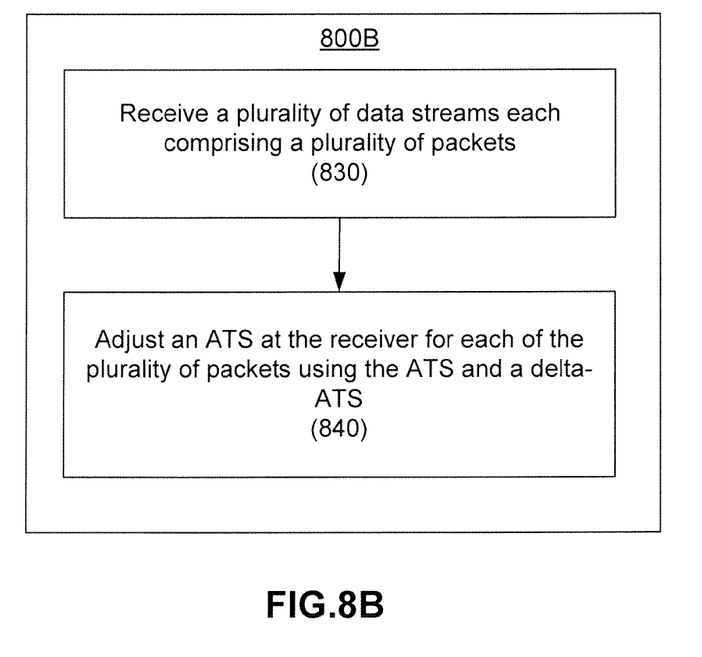

FIGS. 8A-8B illustrate examples methods 800A and 800B for clock recovery in a transponder-bonded receiver system in accordance with one or more implementations of the subject technology. The steps of the method 800A and 800B do not need to be performed in the order shown and one or more steps may be omitted. A number of data streams (e.g., 116 of FIG. 1 or 210, 220, and 230 of FIG. 2), each including several marker packets (e.g., 202 of FIG. 2) that include marker packet information, may be received (810). Bonding clock references (BCRs) (e.g., BCR1-BCR7 of FIG. 4) may be embedded in the marker packet information. Arrival-time-stamps (ATSs) of the marker packets may be adjusted using the BCRs (e.g., as shown in 430 of FIG. 4) (820). Adjusting the ATSs of the marker packets may include capturing timing between the marker packets based on a local free running counter of the receiver.

Multiple data streams (e.g., 620, 630, and 640 of FIG. 6A) each including several packets may be received (830). An adjusted ATS corresponding to an ATS at the receiver for each of the plurality of packets may be determined using the ATS and a delta-ATS (e.g., as described with regard to FIGS. 6A and 6B) (840). The data streams may include marker packets including distribution information that facilitates collating the received data packets. In one or more implementations, the adjusted ATS values may be determined by a demodulator chip or a back-end chip.

The subject technology allows customers with different networking requirements to be serviced by the same switch or router chip using dynamically tunable heterogeneous latencies. The disclosed solution provides a number of advantageous features, for example, completely configurable method of choosing different latencies; control plane/data plane traffic that can be put in different latency paths; catering to different deployment scenarios without any hardwired configuration by same switches/routers; and allowing power saving as a default deployment, if one or more pipeline stages are always bypassed.

The heterogeneous latency technique can be a useful tool in the software defined networking (SDN) framework. Not only does this technique enable dynamic provisioning of latency from a centralized controller in the SDN environment, it also helps the users to experiment with different latencies and their impact on applications without disturbing the mainline traffic. This can enable a quick effective feedback loop between the equipment manufactures and the users, thereby promoting future innovations at a rapid pace, which is one of the core visions of SDN. For instance, 911 calls can be diverted through a low-latency path without the need for separate costly equipment. The subject solution may enable a long list of innovations, for example, trading houses can exploit these techniques to enable algorithmic trading at a low cost in a dynamic fashion.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature of the subject technology.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method for clock recovery in a transponder-bonded system, the method comprising:
    receiving, at a set-top box receiver, a plurality of data streams, each data stream comprising a plurality of chunks of packets from multiple transponders and a plurality of marker packets including marker packet information, wherein bonding clock references (BCRs) are embedded in the marker packet information;
    adjusting arrival-time-stamps (ATSs) of the plurality of marker packets using the BCRs,
    wherein adjusting the ATSs of the plurality of marker packets include using an ATS of a reference-marker packet of a band-0 corresponding to a primary transponder and evaluating the adjusted ATSs for other marker packets of a chunk of packets, using a corresponding ATS and a respective adjusted ATS to ensure that the adjusted ATSs are usable.

2. The method of claim 1, wherein a BCR comprises a snapshot of a free running timestamp counter, at a distributor of a head-end, taken at a marker-packet sync, and wherein a format of the BCR is the same as a format of an MPEG2 program clock reference (PCR), and wherein the plurality of data streams are received from a plurality of transponders.

3. The method of claim 1, further comprising determining an adjusted ATS of each marker packet of the plurality of marker packets based on the ATS of the reference-marker packet of the band-0 and a chunk size.

4. The method of claim 1, further comprising determining an adjusted ATS of each marker packet of the plurality of marker packets based on a difference between a corresponding BCR of that marker packet and a BCR of the reference-marker packet of the band-0.

5. The method of claim 1, further comprising generating a fat destination transmit stream (FDTS) by collating the plurality of data streams including the plurality of marker packets with corrected ATSs.

6. A method for clock recovery at a set-top box receiver of a transponder-bonded system, the method comprising:
receiving a plurality of data streams, each data stream comprising a plurality of packets; and
determining an adjusted arrival-time-stamp (ATS) corresponding to an ATS at the receiver for each of the plurality of packets using the ATS and a delta-ATS,
wherein the plurality of data streams include marker packets including distribution information that facilitates collating the received data packets, and the method further comprises adjusting ATSs of a plurality of marker packets including using an ATS of a reference-marker packet of a band-0 corresponding to a primary transponder and evaluating the adjusted ATSs for other marker packets of a chunk of packets, using a corresponding ATS and a respective adjusted ATS to ensure that the adjusted ATSs are usable.

7. The method of claim 6, wherein receiving the plurality of data streams comprises receiving the plurality of data streams from a plurality of transponders, wherein the ATS is generated in a demodulator chip or a back-end chip, and wherein determining the adjusted ATS is performed by the demodulator chip or the back-end chip.

8. The method of claim 6, further comprising determining the delta-ATS based on a timing difference between marker packets in a receiver clock domain, and determining the timing difference between the marker packets in the receiver clock domain based on a timing difference between corresponding packets in a head-end source transport stream (FSTS).

9. The method of claim 8, further comprising determining the delta-ATS by dividing a difference between ATS of the corresponding packets by a count of packets between the corresponding packets in the head-end FSTS, or determining the count of the packets between the corresponding packets in the head-end FSTS based on the distribution information included in the marker packets.

10. The method of claim 8, wherein determining the adjusted ATS corresponding to the ATS at the receiver for each of the plurality of packets comprises adding the delta-ATS to an ATS corresponding to a preceding packet.

11. A transponder-bonded set-top box receiver system, the system comprising:
one or more interfaces;
logic in communication with the one or more interfaces and configured to:
receive a plurality of data streams each comprising a plurality of marker packets embedded with bonding clock references (BCRs) and including marker packet information; and
adjust arrival-time-stamps (ATSs) of the plurality of marker packets using the BCRs,
wherein the logic is configured to adjust the ATSs of the plurality of marker packets including using an ATS of a reference-marker packet of a band-0 corresponding to a primary transponder and evaluating the adjusted ATSs for other marker packets of a chunk of packets, using a corresponding ATS and a respective adjusted ATS to ensure that the adjusted ATSs are usable.

12. The system of claim 11, wherein the plurality of data streams are received from a plurality of transponders, wherein a BCR comprises a snapshot of a free running timestamp counter, at a distributor of a head-end, taken at a marker-packet sync, and wherein a format of the BCR is the same as a format of an MPEG2 program clock reference (PCR).

13. The system of claim 11, wherein the logic is configured to adjust the ATSs of the plurality of marker packets by using an ATS of a reference-marker packet of a primary band, wherein the primary band comprises a transponder of the plurality of transponders.

14. The system of claim 13, wherein the logic is further configured to determine an adjusted ATS of each marker packet of the plurality of marker packets based on a difference between a corresponding BCR of that marker packet and a BCR of the reference-marker packet of the primary band.

15. The system of claim 13, wherein the logic is further configured to determine the adjusted ATS of each marker packet of the plurality of marker packets based on the ATS of the reference-marker packet of the primary band and a chunk size, wherein the chunk size comprises a count of a plurality of packets between two marker packets in a source transport stream (FSTS) domain, wherein the count of the plurality of packets between two marker packets is derived from chunk size information, and wherein the count of the plurality of packets between marker packets is measured at the receiver.

16. The system of claim 11, wherein the logic is further configured to generate a fat destination transmit stream (FDTS) by collating the plurality of data streams including the plurality of marker packets with corrected ATSs.

17. A transponder-bonded set-top box receiver system, the system comprising:
one or more interfaces;
logic in communication with the one or more interfaces and configured to:
receive, from each of a plurality of transponders, a plurality of data streams each comprising a plurality of packets; and
determine an adjusted arrival-time-stamp (ATS) corresponding to an ATS at the receiver for each of the plurality of packets using the ATS and a delta-ATS,
wherein the plurality of data streams include marker packets including distribution information that facilitates collating data packets received from the plurality of transponders, and the logic is further configured to adjust ATSs of a plurality of marker packets that includes using an ATS of a reference-marker packet of a band-0 corresponding to a primary transponder and evaluating the adjusted ATS for other marker packets of a chunk of packets, using a corresponding ATSs and a respective adjusted ATS to ensure that the adjusted ATSs are usable.

18. The system of claim 17, wherein the logic is configured to determine the delta-ATS based on a timing difference between marker packets in a receiver clock domain, and wherein the logic is configured to determine the timing difference between the marker packets in the receiver clock domain based on a timing difference between corresponding packets in a head-end source transport stream (FSTS).

19. The system of claim 18, wherein the logic is configured to determine the delta-ATS by dividing a difference between ATS of the corresponding packets by a count of packets between the corresponding packets in the head-end FSTS, and wherein the logic is configured to determine the count of the packets between the corresponding packets in the head-end FSTS based on the distribution information included in the marker packets.

20. The system of claim 18, wherein the logic is configured to determine the adjusted ATS corresponding to the ATS at the receiver for each of the plurality of packets by adding the delta-ATS to an ATS corresponding to a preceding packet.

21. A transponder-bonded set-top box receiver system with clock recovery, the system comprising:
   memory; and
   one or more processors coupled to the memory and configured to execute one or more program modules to perform:
      receiving a plurality of data streams each comprising a plurality of data packets, and a plurality of marker packets with embedded bonding clock references (BCRs) and including marker packet information;
      adjusting arrival-time-stamps (ATSs) of the plurality of marker packets including using an ATS evaluating the adjusted ATS for other marker packets of a chunk of packets, using a corresponding ATSs and a respective adjusted ATS to ensure that the adjusted ATSs are usable; and
      determining an adjusted ATS corresponding to an ATS at the receiver for each of the plurality of packets using the ATS and a delta-ATS.

22. The system of claim 21, wherein adjusting the ATSs of the plurality of marker packets comprises using an ATS of a reference-marker packet of a primary band, wherein the primary band comprises a transponder of the plurality of transponders.

23. The system of claim 21, wherein the delta-ATS is determined based on a timing difference between marker packets in a receiver clock domain, and wherein the timing difference between the marker packets in the receiver clock domain are determined based on a timing difference between corresponding packets in a head-end source transport stream (FSTS).

24. The method of claim 3, wherein the chunk size comprises a count of a plurality of packets between two marker packets in a fat source transport stream (FSTS) domain, and further comprising deriving the count of the plurality of packets between two marker packets from chunk size information, and further comprising measuring the count of the plurality of packets between marker packets at the receiver.

* * * * *